United States Patent [19]

Yasuda

[11] Patent Number: 5,799,192
[45] Date of Patent: *Aug. 25, 1998

[54] TOOL ENCAPSULATING METHOD AND APPARATUS THEREOF

[75] Inventor: Mitsuhiro Yasuda, Itami, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 738,685

[22] Filed: Oct. 28, 1996

Related U.S. Application Data

[63] Continuation of Ser. No. 257,742, Jun. 8, 1994, abandoned.

[30] Foreign Application Priority Data

Jun. 11, 1993 [JP] Japan .................... 5-140718

[51] Int. Cl.⁶ .................... G06F 9/45
[52] U.S. Cl. .................... 395/701
[58] Field of Search .................... 395/705, 706, 395/701, 613

[56] References Cited

U.S. PATENT DOCUMENTS

| | | | |
|---|---|---|---|
| 5,075,847 | 12/1991 | Fromme | 395/700 |
| 5,423,023 | 6/1995 | Batch et al. | 395/401 |
| 5,551,030 | 8/1996 | Linden et al. | 395/613 |

FOREIGN PATENT DOCUMENTS

| | | |
|---|---|---|
| 334018 | 2/1991 | Japan . |
| 4257973 | 9/1992 | Japan . |

OTHER PUBLICATIONS

Goeting, Richard, "Viewlogic Adds to Framwork," Electronic Engineering Times, pp. 1-2. Jun. 21, 1993.
Coelho, D.R., "VHDL Looks for Open ASIC Library,"Electronic Engineering Times, pp. 1-4. Jun. 14, 1993.

*Primary Examiner*—Emanuel Todd Voeltz
*Assistant Examiner*—Peter J. Corcoran, III
*Attorney, Agent, or Firm*—Oblon, Spivak, McClelland, Maier & Neustadt, P.C.

[57] ABSTRACT

The processing contents which change according to the specification of the tool encapsulation are provided through descriptions in the user interface definition file, the parameter definition file and the invocation command definition file. The environment file defines if each of the definition files is to be used or not. The processing system reads the contents of the definition files and converts those into the function presented by the framework to realize the tool encapsulation. The tool encapsulation for the plural kinds of frameworks can be realized with a single common description not using extension languages presented by the frameworks, so that the tool encapsulation operation for the plural kinds of frameworks is considerably shortened and the maintenance efficiency is also improved.

4 Claims, 10 Drawing Sheets

```
;;;
;;;Following environment variable must not be changed.
;;;
EncapSkillDef=nil
EncapFormFunc=t
EncapFieldCheckFunc=nil
EncapParmFunc=t
EncapInvokeFunc=t
EncapPostFunc=nil
EncapApplyButton=nil
EncapFormDef=  "VirtualTool"
EncapParmDef=  "VirtualTool"
EncapInvokeDef= "VirtualTool"
EncapLogFile=  "VirtualTool.log"
EncapRunDir=   ("Virtual/%s" gv_virtualpat)
```

FIG. 4

```
(toggle 'toggle
?prompt "Virtual Simulation Mode"
?choices '("Simulation1" "Simulation2" "Simulation3")
?state '("sim1" "sim2" "sim3")
)

(boolean 'boolean
?prompt "Virtual Simulation Optional Switch"
?state '("ON" "OFF")
)
```

FIG. 6

```
"Virtual Tool Form"
(string 'string
?prompt "Tool Name"
?value "Virtual Simulation"
?editable nil
?global 'gd_string
)

(file 'file
?prompt "Data File"
?value "~/Virtual/virtual.data"
?global 'gd_file)
)

(directory 'directory
?prompt "Pattern Directory"
?value ""
?global 'gd_directory
)

(integer 'integer
?prompt "Virtual Simulation Time [s]"
?value 0
)

(float 'float
?prompt "Virtual Simulation Count [tu]"
?value 0.0
)

)scale 'scale
?prompt "Virtual Simulation Range [0-10]"
?value 0
?range '(0-10)
)

(cyclic 'cyclic
?prompt "Virtual Node"
?choices ("Local Node" "Virtual Node1" "Virtual Node2")
?global gd_RunNode
)

(radio 'radio
?prompt "Virtual Simulation Netlist Format"
?choices ("Virtual Net-1" "Virtual Net-2")
?state ("VNET1" "VNET2")
)
```

FIG. 5

```
-tool 'gd_string'
_datafile 'gd_file'
-patdir 'gv_directory'
-simtime 'EncapFormHandle->integer'
-count 'EncapFormHandle->float'
-range 'EncapFormHandle->scale'
-nettype 'EncapFormHandle->radio'
-mode 'EncapFormHandle->toggle'
-option 'EncapFormHandle->boolean'
```

FIG. 7

```
virtual.sh-rundir 'EncapRunDir '-parmfile 'EncapParmDef '.parm
```

FIG. 8

| OK | Cancel | |

Tool Name          Virtual Simulation

Data File          ~/Virtual/virtual.data

Pattern Dictionary

Virtual Simulation Time     0

Virtual Simulation Count    0.0

Virtual Simulation Range    ☐☐

Virtual Node                Virtual Node

Virtual Simulation Netlist Format  ◆ Virtual Net-1   ◇ Virtual Net-2

Virtual Simulation Mode    ■ Simulation1  ☐ Simulation2  ☐ Simulation3

Virtual Simulation Optional Switch ■

*FIG. 10*

TOOL ENCAPSULATING METHOD AND APPARATUS THEREOF

This application is a Continuation of application Ser. No. 08/257,742, filed on Jun. 8, 1994, now abandoned.

BACKGROUND OF THE INVENTION

1. Field of the Invention

The present invention generally relates to those which take the method of framework in the systematization technique such as the soft development environment and the CASE (computer aided software engineering), and particularly to a method and an apparatus for encapsulating a tool for designing an object of design such as the LSI (large scale integrated) using the CAD (computer aided design) into a framework for the CAD.

2. Description of the Background Art

FIG. 11 is a block diagram showing a conventional tool encapsulating apparatus. Various frameworks A, B, . . . which are presented from different vendors have conventionally been known as the frameworks for the electric system CAD for designing the LSI. When configuring a system by encapsulating various tools for designing of the LSI such as simulators into such frameworks A, B, . . . , an engineer programs the programs Pa, Pb, . . . for realizing the encapsulation specification using unique tool encapsulating languages (extension languages) a, b, . . . presented by respective frameworks A, B, . . . Then, by working each encapsulation program Pa, Pb, . . . on each framework A, B, . . . , each framework A, B, . . . interprets the contents of each encapsulation program Pa, Pb, . . . and realizes the function of tool encapsulation.

FIG. 12 is a flow chart showing basic contents of the processings realized by the encapsulation programs Pa, Pb, . . . First, the step SI is a step of the user interface for obtaining the tool invocation information. In this step, all the information such as parameters required in invoking the tool is obtained from a user (an LSI designer) through a user interface display output, for example, for urging the user input. Next, the step S2 is a step for checking if the information such as a parameter inputted by the user is correct or not. If it is not correct, the flow proceeds to the step S3 to perform an error processing, for example. If it is correct, the flow proceeds to the step S4 to generate an invocation command for actually invoking the tool from the data inputted in the step S1. Next, in the step S5, the invocation command generated in the step S4 is activated using the function of the framework to perform execution control of the tool. When the execution of the tool is finished, it proceeds to the step S6, where the termination process is executed corresponding to the termination state of the tool (the normal termination or the abnormal termination, for example) and the termination state of the tool is indicated to the user.

In the conventional tool encapsulation apparatus shown in FIG. 11, the tool encapsulation must be realized by producing the encapsulation programs Pa, Pb, . . . generally including the processing procedure in FIG. 12 using extension languages a, b, . . . presented by the respective frameworks A, B, . . . for each framework A, B, . . . of different kind. Accordingly, the language specification must be understood for each framework to produce a tool encapsulation program, resulting in a problem that the tool encapsulation requires a great deal of labor. Furthermore, in the program maintenance, if the same tool is encapsulated in different kinds of frameworks A, B, . . . , if an encapsulation function in a certain framework is changed, the same change must be made correspondingly using different extension languages in other frameworks, too, resulting in a problem that the overlapping maintenance work requires a great deal of labor.

SUMMARY OF THE INVENTION

According to the present invention, a method of encapsulating a tool for designing an object of design with CAD in a framework for the CAD comprises the steps of preparing a file for providing a description defining a tool encapsulation specification dependent process in which processing contents variously change according to encapsulation specification of the tool, preparing a processing system defining a framework function dependent process in which processing contents are determined depending only on a function of the framework but independently of the encapsulation specification of the tool and also defining a procedure for making the framework execute the framework function dependent process and the tool encapsulation specification dependent process defined by the description in the file, and executing encapsulation of the tool into the framework by providing the file to the framework to which the processing system is applied.

According to the first aspect of the tool encapsulation method of the present invention, the file for providing the description defining the tool encapsulation specification dependent process in which the contents of process variously change according to the specification of the encapsulation of the tool is provided to arbitrarily and variously determine the specification of the encapsulation of the tool through the file, and the framework function dependent process in which the contents of processing are determined depending only on the function of the framework independently of the specification of the tool encapsulation is defined in the processing system, and the procedure for making the framework execute the framework function dependent process and the tool encapsulation specification dependent process is also defined in the processing system. Therefore, only by previously preparing individual processing systems corresponding to each of the plurality of kinds of frameworks, the same tool encapsulation can be realized in the plural kinds of frameworks only by making a description in a single file.

Accordingly, the tool encapsulating operation can be remarkably simplified and the maintenance operation also becomes considerably easier.

Preferably, the step of preparing the file includes at least one of the steps of preparing a user interface definition file providing a description for defining a user interface for obtaining predetermined information necessary to invoke the tool from a user, preparing a parameter definition file for providing a description defining a parameter for transferring the predetermined information to the framework as tool invocation information, and preparing an invocation command definition file for providing a description defining generation of a tool invocation command defining an invocation sequence of the tool.

According to the second aspect of the tool encapsulation method of the present invention, at least one of the step of preparing the user interface definition file, the step of preparing the parameter definition file and the step of preparing the invocation command definition file is provided as the step of preparing a file. Therefore, a file can be newly provided, or the described contents in the file can be added, changed or deleted only in a necessary file.

Preferably, the tool encapsulation method further includes the step of preparing an environment definition file for providing a description specifying as to whether each of the user interface definition file, the parameter definition file and the invocation command definition file is to be used or not, and the step of executing encapsulation of the tool includes the step of executing encapsulation of the tool in the framework with any of the user interface definition file, the parameter definition file and the invocation command definition file which is specified to be used by the environment definition file by providing the environment definition file to the framework to which the processing system is applied.

According to the third aspect of the tool encapsulation method of the present invention, the tool encapsulation is executed in the framework using only a desired one(s) of the user interface definition file, the parameter definition file and the invocation command definition file according to the contents of the environment definition file. Therefore, an encapsulation program in an extension language, for example, which is separately prepared can also be used in part where the file is not used, and the contents of the encapsulation program separately prepared can be minimum necessity.

The present invention is also directed to an apparatus for encapsulating a tool. According to the present invention, the apparatus for encapsulating a tool for designing an object of design with CAD in a framework for the CAD comprises a file for providing a description defining a tool encapsulation specification dependent process in which processing contents variously change according to encapsulation specification of the tool, and a processing system defining a framework function dependent process in which processing contents are determined depending only on a function of the framework but independently of the encapsulation specification of the tool and also defining a procedure for making the framework execute the framework function dependent process and the tool encapsulation specification dependent process defined by the description in the file, wherein the encapsulation of the tool into the framework is executed by providing the file to the framework to which the processing system is applied.

According to the first aspect of the tool encapsulation apparatus of the present invention, the file for providing the description defining the tool encapsulation specification dependent process in which the contents of process variously change according to the specification of the encapsulation of the tool is provided to arbitrarily and variously determine the specification of the encapsulation of the tool through the description in the file, and the framework function dependent process in which the contents of processing are determined depending only on the function of the framework independently of the specification of the tool encapsulation is defined in the processing system, and the procedure for making the framework execute the framework function dependent process and the tool encapsulation specification dependent process is also defined in the processing system. Therefore, only by previously preparing individual processing systems corresponding to each of the plurality of kinds of frameworks, the same tool encapsulation can be realized to the plural kinds of frameworks only by making a description in a single file.

Accordingly, the tool encapsulating operation can remarkably be simplified and the maintenance operation also considerably becomes easier.

Preferably, the file includes at least one of a user interface definition file providing a description defining user interface for obtaining predetermined information necessary to invoke the tool from a user, a parameter definition file for providing a description defining a parameter for transferring the predetermined information to the framework as tool invocation information, and an invocation command definition file for providing a description defining generation of a tool invocation command defining an invocation sequence of the tool.

According to the second aspect of the tool encapsulation apparatus of the present invention, at least one of the user interface definition file, the parameter definition file and the invocation command definition file is provided as a file. Therefore, a file can be newly provided, or the described contents in the file can be added, changed or deleted only in a necessary file.

Preferably, the tool encapsulation apparatus further includes an environment definition file for providing a description specifying as to whether each of the user interface definition file, the parameter definition file and the invocation command definition file is to be used or not, and the encapsulation of the tool in the framework is executed with any of the user interface definition file, the parameter definition file and the start command definition file which is specified to be used by the environment definition file by providing the environment definition file to the framework to which the processing system is applied when executing the tool encapsulation.

According to the third aspect of the tool encapsulation apparatus of the present invention, the tool encapsulation is executed in the framework using only a desired one(s) of the user interface definition file, the parameter definition file and the invocation command definition file according to the contents of the environment definition file. Therefore, an encapsulation program in an extension language, for example, which is separately prepared can also be used in part where the file is not used, and also the contents of the encapsulation program separately prepared can be minimum necessity.

Accordingly, it is an object of the present invention to provide a method and an apparatus for encapsulating a tool in which the same tool can be encapsulated in a plural kinds of frameworks only by making a predetermined description without considering a kind of a framework, that is, an extension language which is unique to the framework.

It is another object of the present invention to provide a method and an apparatus for the tool encapsulation in which the operation of the tool encapsulation is considerably simplified.

It is sill another object of the present invention to provide a method and an apparatus for the tool encapsulation in which the labor of the maintenance in changing the specification of the tool can be remarkably decreased when the same tool is encapsulated in a plural kinds of frameworks.

These and other objects, features, aspects and advantages of the present invention will become more apparent from the following detailed description of the present invention when taken in conjunction with the accompanying drawings.

BRIEF D BRIEF DESCRIPTION OF THE DRAWINGS

FIG. 4 is a diagram showing one example of an environment definition file;

FIGS. 5 and 6 are diagrams showing an example of a user interface definition file FIG. 7 is a diagram showing an example of a parameter definition file;

FIG. 8 is a diagram showing an example of an invocation command definition file

FIG. 10 is a diagram showing an example of the form;

DESCRIPTION OF THE PREFERRED EMBODIMENT

Figure 1:
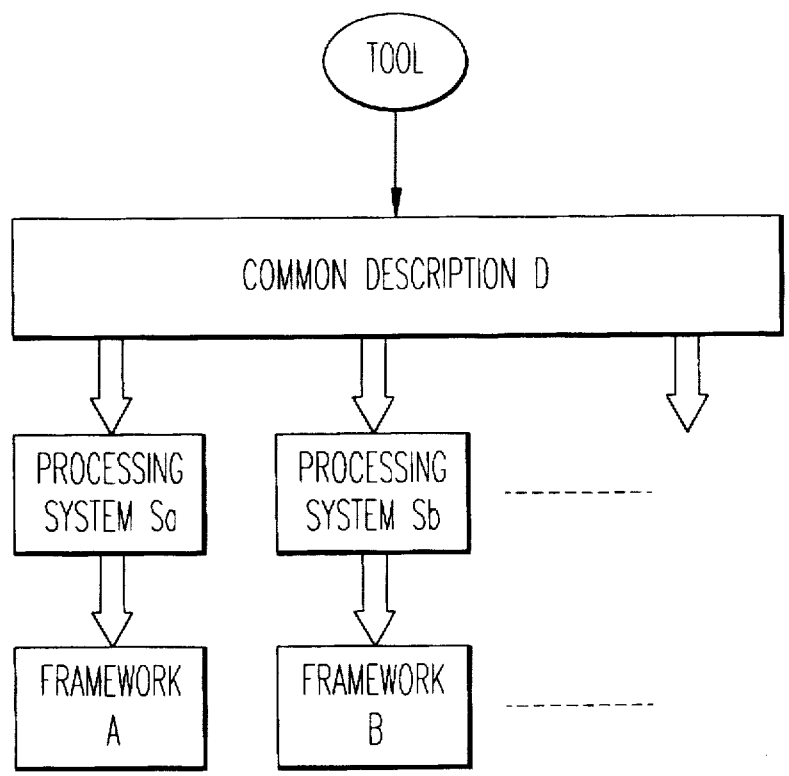
FIG. 1 is a block diagram showing a preferred embodiment of a tool encapsulation apparatus according to the present invention.

FIG. 1 is a block diagram showing one preferred embodiment of a tool encapsulation apparatus according to the present invention. The same tool for LSI designing, for example, is encapsulated in a plurality of frameworks A, B, . . . for the electric system CAD provided by a plurality of vendors, for example. A tool encapsulating engineer prepares a common description D for the plurality of frameworks A, B, . . . in common according to the specification of tool encapsulation regardless of extension languages each unique to each of the frameworks A, B, . . . Processing systems Sa, Sb, . . . are prepared in advance for each of the frameworks A, B, . . . . Each processing system Sa, Sb, . . . defines the processing procedure according to the functions of each framework A, B, . . . so that each framework A, B, . . . can perform the tool encapsulation operation according to the common description D. This enables the engineer to realize the tool encapsulation to the plural kinds of frameworks A, B, . . . at a time only by preparing one common description D for the tool encapsulation. When the specification of the tool encapsulation is changed, the engineer can deal with the plural kinds of frameworks A, B, . . . only by changing the contents of the single common description D, so that the maintenance work is very easy. Furthermore, the common description D can satisfactorily include a predetermined description independent of the extension languages for individual frameworks A, B, . . . , so that the labor of understanding the extension languages is not required.

Figure 2:
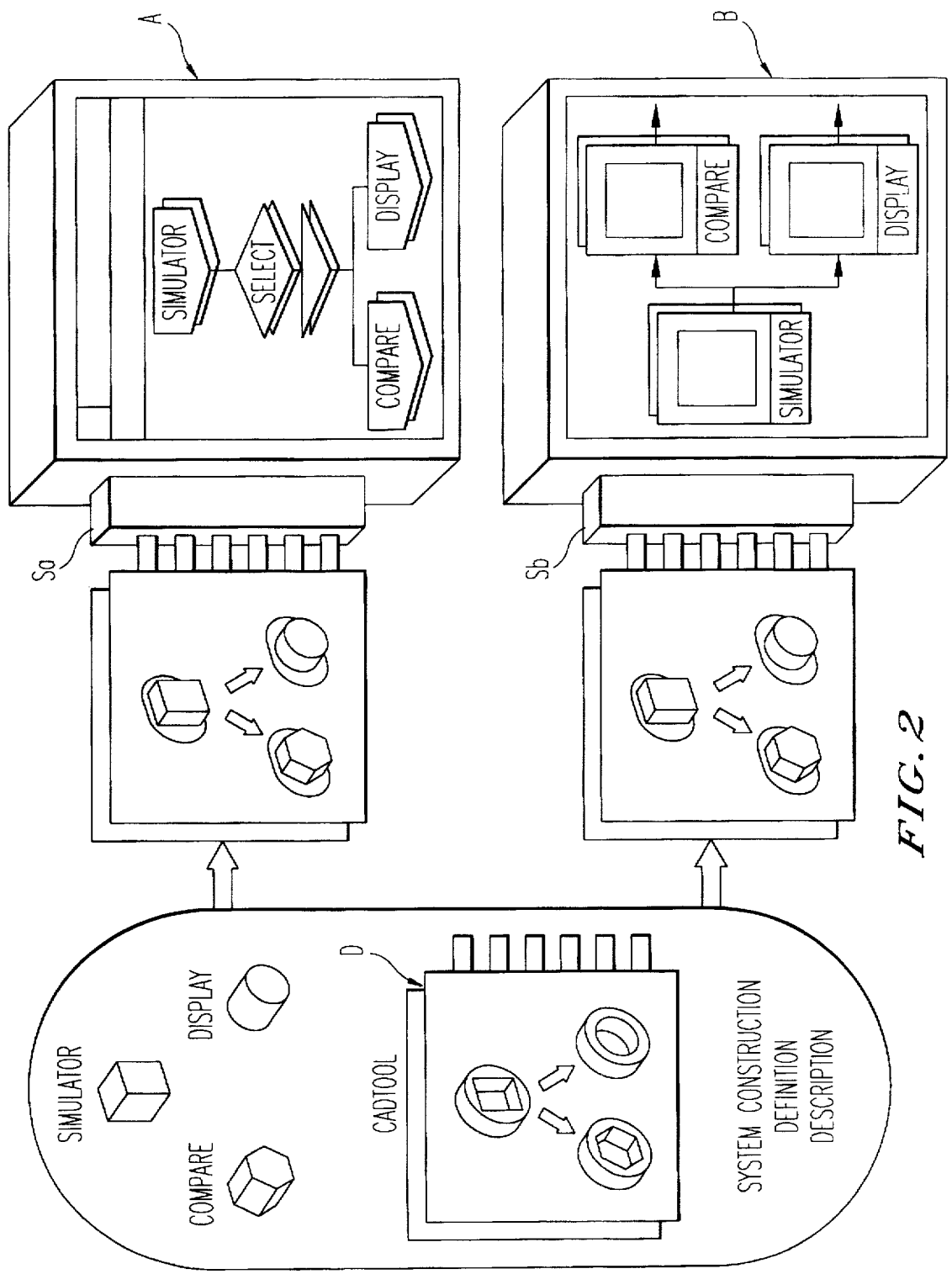
FIG. 2 is a diagram showing the specific image of the concept in FIG. 1.

FIG. 2 is a diagram showing the specific image of the concept in FIG. 1. In the figure, the example is shown in which the SIMULATOR, the COMPARE and the DISPLAY which are CAD tools are encapsulated by the common description D (system configuration definition description) through the processing systems Sa, Sb to the two frameworks A and B.

Figure 3:
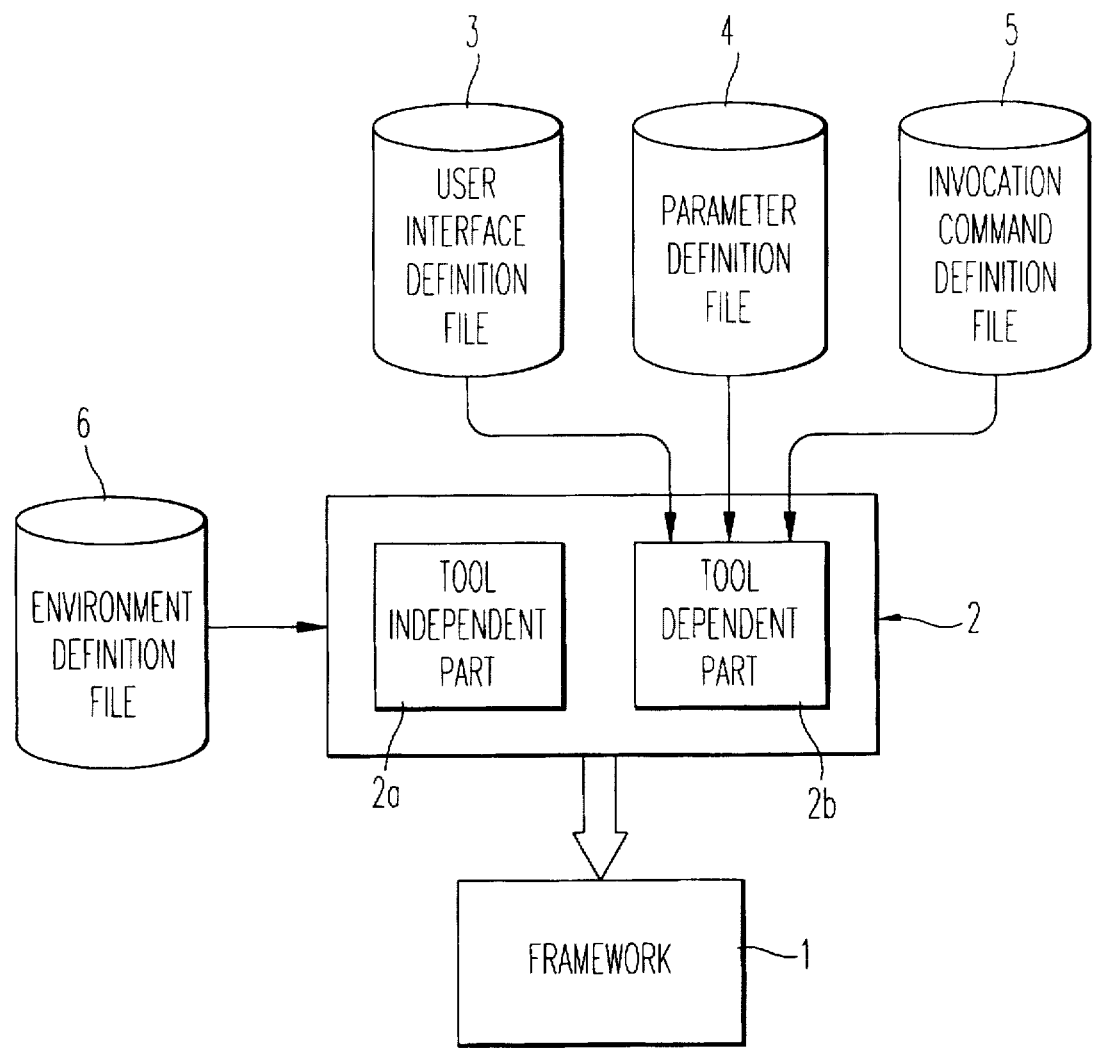
FIG. 3 is a block diagram showing the common description and the processing system in detail.

FIG. 3 is a block diagram showing in detail the relation among the common description D, one of the processing systems Sa, Sb, . . . and one of the frameworks A, B, . . . . A processing system 2 is prepared in advance for a framework 1. As the common description D, a user interface definition file 3, a parameter definition file 4, and an invocation command definition file 5 having contents corresponding to the tool encapsulation specification are prepared. The processing system 2 has a function of reading the contents of the user interface definition file 3, the parameter definition file 4, and the invocation command definition file 5 and realizing the act the same as that in the case where the tool encapsulation specification is described in the extension language on the framework 1. Furthermore, an environment definition file 6 is provided for making a determination as to whether the processing contents of each of the user interface definition file 3, the parameter definition file 4 and the invocation command definition file 5 are to be executed or not according to the characteristic of the tool.

The user interface definition file 3, the parameter definition file 4 and the invocation command definition file 5 are files for providing descriptions which define the tool encapsulation specification dependent process having its processing contents variously changing according to the specification of the tool encapsulation. The processing system 2 has a tool independent part 2a and a tool dependent part 2b. The tool independent part 2a defines the framework function dependent process in which its processing contents are determined depending only on the function of the framework independently of the specification of the tool encapsulation and also defines the procedure for making the framework 1 execute the framework function dependent process. The tool dependent part 2b defines the procedure for making the framework 1 execute the tool encapsulation specification dependent process defined by the user interface definition file 3, the parameter definition file 4 and the invocation command definition file 5. By applying the processing system 2 to the framework 1 and providing the definition files 3 through 6, the tool encapsulation in the framework 1 is realized by any of the user interface definition file 3, the parameter definition file 4 and the invocation command definition file 5 which is specified to be used by the environment definition file 6.

The environment definition file 6 provides a description for defining as to whether each of the user interface definition file 3, the parameter definition file 4, and the invocation command definition file 5 is to be used or not. One example of the environment definition file 6 is shown in FIG. 4.

The user interface definition file 3 provides a description defining the user interface for acquiring from a user predetermined information required for invoking the tool. One example of the user interface definition file 3 is shown in FIG. 5 and FIG. 6.

The parameter definition file 4 provides a description defining parameters for transferring the predetermined information obtained using the user interface definition file 3 to the framework 1 as tool invocation information. One example of the parameter definition file 4 is shown in FIG. 7.

The invocation command definition file 5 provides a description defining generation of a tool invocation command defining the invocation sequence of the tool. One example of the invocation command definition file 5 is shown in FIG. 8.

Figure 9:
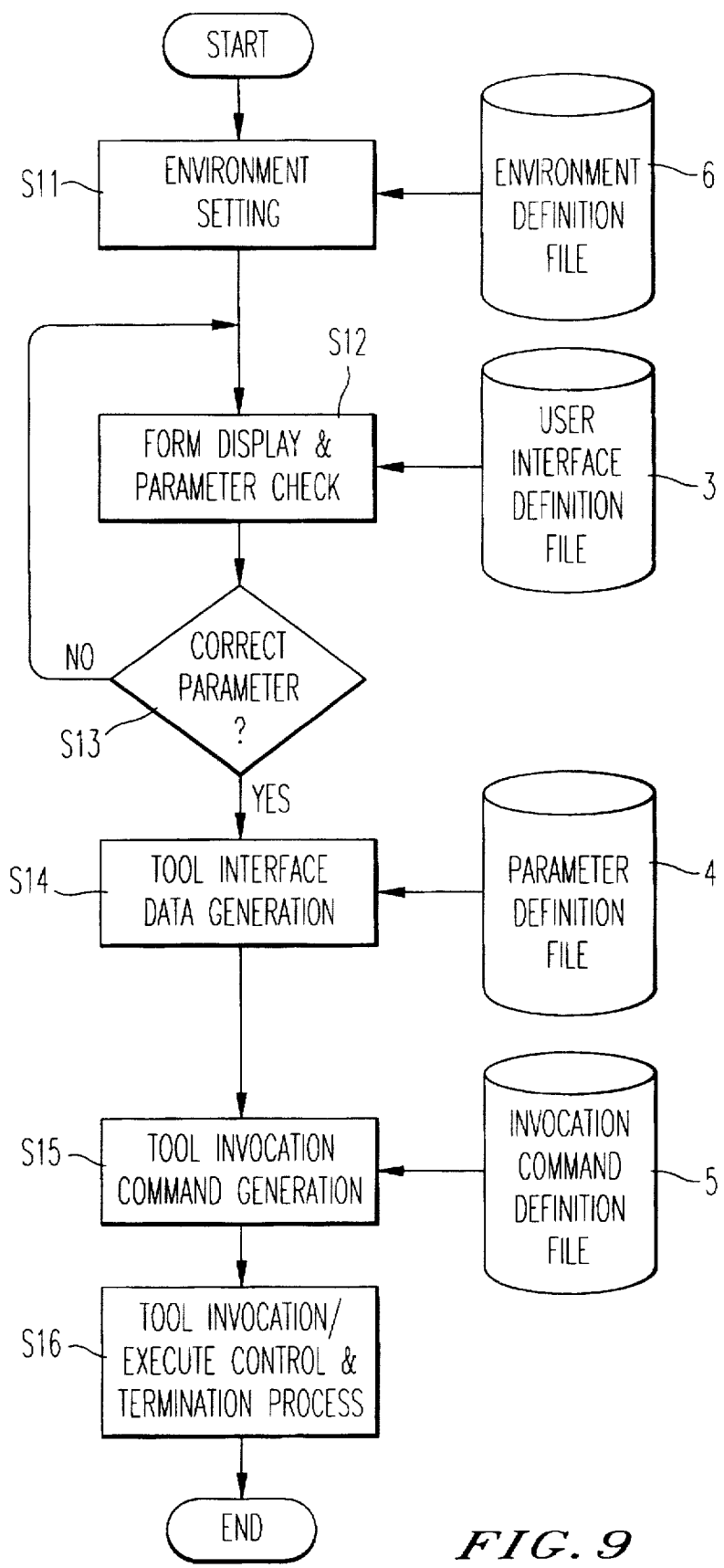
FIG. 9 is a flow chart illustrating the processing procedure in the processing system.
Figure 11:
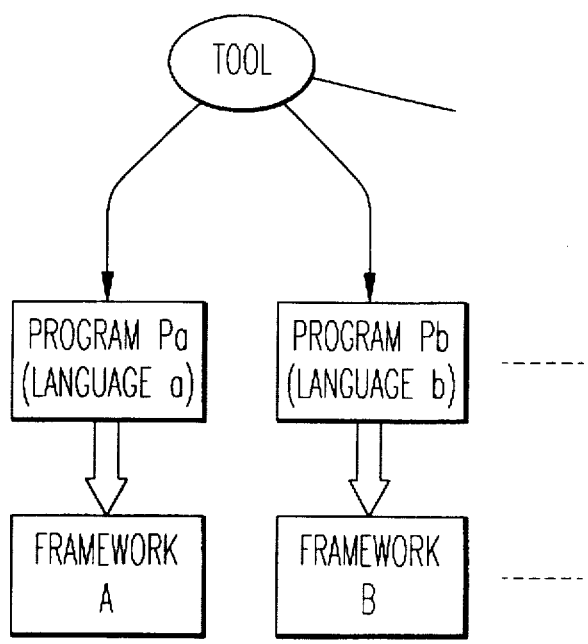
FIG. 11 is a block diagram showing a conventional tool encapsulation apparatus.
Figure 12:
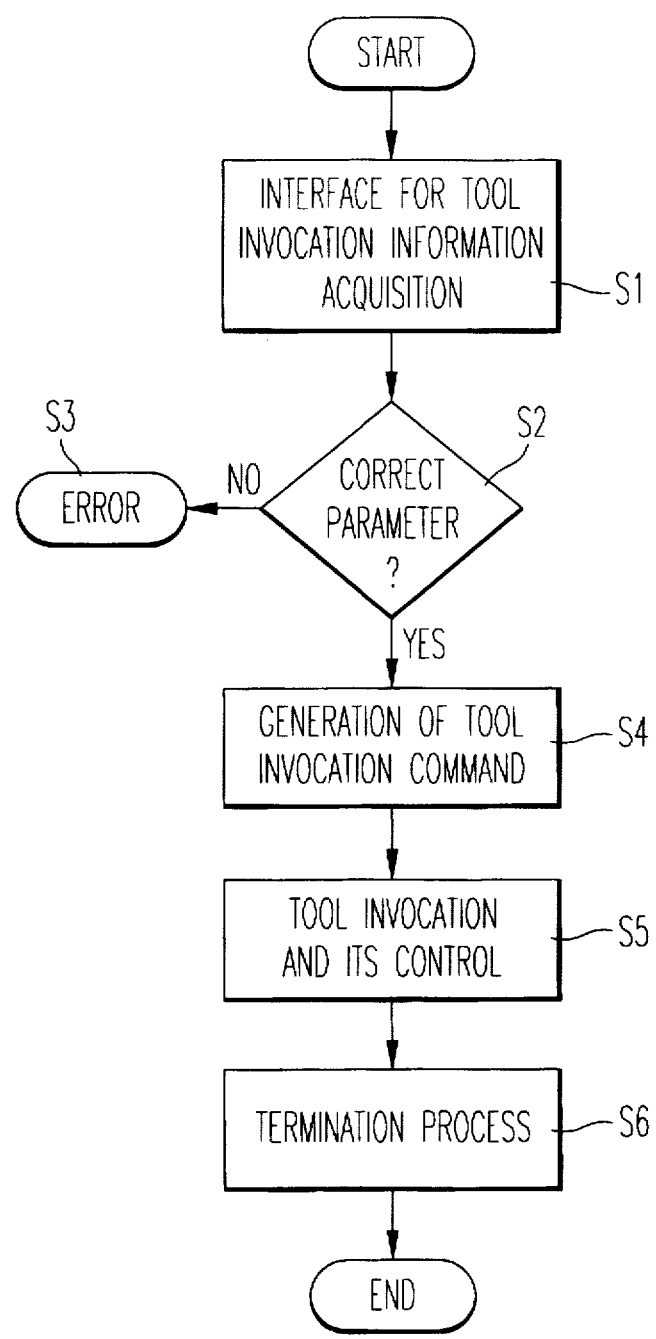
FIG. 12 is a flow chart illustrating the processing in a conventional encapsulation program.

FIG. 9 is a flow chart illustrating one example of the processing procedure in the processing system 2. The processing system 2 can substantially be composed of a program working on the framework 1. The contents of each step are determined by the environment definition file 6, the user interface definition file 3, the parameter definition file 4 and the start command definition file 5 in the environment setting in the step S11, the form display and the parameter check in the steps S12 and S13, the tool interface data generation in the step S14 and the generation of the tool invocation command in the step S15, respectively. The details in the precesses will be described later.

Now, the general processing contents made in the conventional tool encapsulation program can be classified as described below.

(a) The pre-processing for encapsulation;

(b) The production of the user interface for acquiring tool invocation information;

(c) Check as to whether the acquired information is correct or not;

(d) Expansion of the tool invocation information inputted by a designer using (b) into actual tool invocation information;

(d1) Production of the input data file;

(d2) Production of the tool invocation command;

(e) Tool invocation/execution control;

(f) After-processing at the tool termination.

The processing contents of (a), (e) and (f) are uniquely established depending on the functions of the framework not depending on the encapsulated tool. The processing contents of (b), (c) and (d) are determined depending on the encapsulation specification of the tool.

In the present invention, the processing contents of (a), (e) and (f) are defined in the processing system 2. As to (b), (c) and (d), the encapsulation specifications are defined in definition files away from the constraint of the framework as the common description D. Specifically, the user interface definition file 3 is provided to define (b) and (c), the parameter definition file 4 is provided to define (d1), and the invocation command definition file 5 is provided to define (d2).

In the environment definition file 6 of FIG. 4, "EncapSkillDef=nil" means to skip the load processing of the SKILL file. Now, "SKILL" is an extension language of the framework OPUS/DFII produced by Cadence Design Systems, Inc., and the SKILL file means an encapsulation program the same as the conventional one written using the extension language SKILL. "EncapFormFunc=t" means to display the form (FIG. 10) according to the user interface definition file 3. "EncapFieldCheckFunc=nil" means to skip the checking process of a field value by the SKILL function. "EncapParmFunc=t" means to produce a parameter file according to the parameter definition file 4. "EncapInvokeFunc=t" means to invoke the tool according to the invocation command definition file 5. "EncapPostFunc= nil" means to skip the after-processing of the tool execution by the SKILL function. "EncapApplyButton=nil" means designation of not providing an Apply button to the form. "EncapFormDef=" is followed by a user interface definition file name. "EncapParmDef=" is followed by a parameter definition file name. "EncapInvokeDef=" is followed by an invocation command definition file name. "EncapLogFile=" is followed by a log file name. "EncapRunDir=" is followed by a tool execution directory. Other than those described above, there are the execution node of tool, the execution priority of tool and so on.

The user interface definition file 3 in FIG. 5 works to construct a user interface using parts of graphic such as the menu and the form. One example of the form is shown in FIG. 10. One menu or form each has a field to store information.

The following contents can be defined in the user interface definition file 3.

(1) The order of arrangement of the fields;

(2) The type of field (character/integer, etc.);

(3) The characteristic by fields (prompt, or display only, etc.);

(4) The checking function by fields;

(5) The mechanism of interchange of information with the framework.

This can define the contents of the above-described (b) The production of the user interface for acquiring tool invocation information and (c) Check as to whether the acquired information is correct or not, and which are converted in functions which correspond to the framework 1 by the processing system 2.

One field starts with "("and ends with")". As to (1) the order of arrangement of the fields mentioned above, they may be displayed in the order of description in the field description. The top may be the title field, and following ones may be described by field types. FIG. 10 is a diagram showing a display corresponding to the description in FIG. 5. The above-described (2) the type of field (character/integer, etc.) includes "string, file, . . . . boolean". The above-described (3) characteristics by fields (prompt, or display only, etc.) includes "?editable nil", for example, which indicates "display only". The above-described (4) the checking function by fields includes "?range", for example, which checks as to whether a numeral value in the specified range (0 10) has been inputted or not. The above-described (5) the mechanism of interchange of information with the framework will be described in the description on the parameter definition file 4 below.

The parameter definition file 4 is a file for defining the method of producing a parameter file of the tool (Shell Script). The template of the contents to be written in the parameter file of the tool (Shell Script) is described in the parameter definition file 4. The Shell Script is a command sequence generally provided in the UNIX which is a typical operating system of the framework.

As shown in FIG. 7, the key words of parameters of the tool "-tool", . . . . , "-option" are written as they are in the parameter definition file 4. The remaining descriptions are for reference of values. For example, "'gd_string'" means transmission of data by the global variable, which can refer to values of forms in other design steps (such a display as shown in FIG. 10 in another design step). Now, the design step means the SIMULATOR, the COMPARE, and the DISPLAY in the display of the frameworks A and B in FIG. 2, for example. In this case, the value inputted in the global variable designated by "?global 'gd_string'" in the user interface definition file 3 is referred to. "'EncapFormHandle→integer'" is a reference utilizing a pointer of the form, where "EncapFormHandle" indicates a name of the form and "integer" indicates a name of the field. Thus the value in the "integer" field in that form is referred to.

The invocation command definition file 5 is a file for defining the invocation sequence of the tool (Shell Script). In the invocation command definition file 5 of FIG. 8, "EncapRunDir" indicates a tool execution directory and "EncapParmDef" indicates a parameter definition file name. The Shell Script is executed according to this command sequence. Describing the tool invocation in the Shell Script to actually give the tool the parameter file produced according to the definition in the parameter definition file 4 enables transmission of all the argument information to the tool. That is to say, the interface with the tool is made with the data in which arguments for invocation are filed, but if the actual tool does not require these arguments but requires another data format, a measure can be taken by invoking the tool from the Shell Script and producing the required data and the like in the Shell Script.

Next, the flow chart of FIG. 9 showing the processing procedure in the processing system 2 will be described. First, in the step S11, one of the three is selected, that is, the encapsulation operation is to be defined by the definition files, this step is to be omitted, or, the program written in the extension language separately prepared is to be used, about each of the steps S12, S14, and S15 according to the description in the environment definition file 6. Also, the following information necessarily required in encapsulating are described, that is, the log file name, the execution directory, directory which is based on, the execution node of tool and the execution priority of tool.

Next, in step S12, such a form display as shown in FIG. 10 is made according to the contents of the user interface definition file 3 and the user inputs the parameters which the tool needs using the form. In the step S13, the correctness of the inputted parameters is checked referring to the contents of the user interface definition file 3 about the input in each field in the form. Then, if it is correct, the flow proceeds to the step S14, and if it is not correct, a warning message is outputted and it returns to the form output in the step S12. In the step S14, a parameter file for taking the interface with the invocation tool is produced on the basis of the parameter definition file 4. As has been described above, the tool is not directly invoked in this preferred embodiment, but the Shell Script keeping the interface rules with the parameter file is invoked. There is the parameter definition file 4 as a template definition file of the parameter file. If there is no execution directory for outputting the interface data or invoking the tool at this time, it is produced by "EncapRunDir". Next, in the step S15, the tool invocation command is produced according to the invocation command definition file 5. Then in the step S16, the tool invocation/execution control is performed using the tool invocation control function which the framework has, and the terminal processings are performed such as the normal termination, the error termination and so on. Necessary information such as the log file name, the tool execution node, the tool execution priority and the like are referred to at the time of tool invocation. Thus, the same function as an encapsulation program described in the extension language can be realized using the definition files 3 through 6 in the processings described above.

While the invention has been shown and described in detail, the foregoing description is in all aspects illustrative and not restrictive. It is therefore understood that numerous modifications and variations can be devised without departing from the scope of the invention.

I claim:

1. A method of encapsulating a tool for designing an object of design with computer aided design (CAD) in a plurality of frameworks for the CAD, each framework having a Shell Script as a command sequence and having a different unique extension language for tool encapuslation, comprising the steps of:

preparing a file for commonly providing to said plurality of frameworks regardless of said extension language a common description defining a tool encapsulation specification dependent process in which processing contents variously change according to an encapsulation specification of said tool;

preparing a plurality of processing systems, each processing system being encapsulated to only a respective framework and defining a respective tool independent framework function dependent process in which processing contents are determined depending only on a function of said respective framework but independently of said encapsulation specification of said tool and for defining a tool independent procedure for making said respective framework execute said respective framework function dependent process and also defining a tool dependent procedure for making said respective framework execute said tool encapsulation specification dependent process defined by the description in said file; and executing encapsulation of said tool into said plurality of frameworks by providing said file to each of said respective frameworks to which said respective processing system is encapsulated;

wherein the step of preparing said file includes at least one of the steps of preparing a user interface definition file providing a description defining user interface for acquiring predetermined information necessary to invoke said tool from a user, preparing a parameter definition file for providing a description defining producing a parameter file in accordance with the Shell Script for transferring said predetermined information to said framework as tool invocation information, and preparing an invocation command definition file for providing a description defining generation of a tool invocation command for defining an invocation sequence of said tool in accordance with an invocation of the Shell Script.

2. The tool encapsulation method according to claim 1, further comprising the step of preparing an environment definition file for providing a description for specifying as to whether each of said user interface definition file, said parameter definition file and said invocation command definition file is to be used or not; wherein said step of executing encapsulation of said tool includes the step of executing encapsulation of said tool in said framework by any of said user interface definition file, said parameter definition file and said invocation command definition file which is specified to be used by the environment definition file by providing said environment definition file to said framework to which said processing system is applied.

3. An apparatus for encapsulating a tool for designing an object of design with computer aided design (CAD) in a plurality of frameworks for the CAD, each framework having a Shell Script as a command sequence and having a different unique extension language for tool encapsulation, comprising:

a file for commonly providing to said plurality of frameworks regardless of said extension language a common description defining a tool encapsulation specification dependent process in which processing contents variously change according to an encapsulation specification of said tool; and a plurality of processing systems, each processing system being encapsulated to only a respective framework and defining a respective tool independent framework function dependent process in which processing contents are determined depending only on a function of said respective framework but independently of said encapsulation specification of said tool and for defining a tool independent procedure for making said respective framework execute said respective framework function dependent process and also defining a tool dependent procedure for making said respective framework execute said tool encapsulation specification dependent process defined by the description in said file; wherein encapsulation of said tool into said plurality of frameworks is executed by providing said file to each of said respective frameworks to which said respective processing system is encapsulated;

wherein said file comprises at least one of a user interface definition file providing a description for defining user interface for acquiring predetermined information necessary to invoke said tool from a user, a parameter definition file for providing a description defining producing a parameter file in accordance with the Shell Script for transferring said predetermined information to said framework as tool invocation information, and an invocation command definition file for providing a description defining generation of a tool invocation command for defining an invocation sequence of said tool in accordance with an invocation of the Shell Script.

4. The tool encapsulation apparatus according to claim 3, further comprising an environment definition file for providing a description specifying if each of said user interface definition file, said parameter definition file and said invocation command definition file is to be used or not; wherein encapsulation of said tool in said framework is executed by any of said user interface definition file, said parameter definition file and said invocation command definition file which is specified to be used by the environment definition file by providing said environment definition file to said framework to which said processing system is applied when executing said tool encapsulation.

* * * * *